(12) United States Patent
Megginson

(10) Patent No.: US 10,235,384 B2
(45) Date of Patent: *Mar. 19, 2019

(54) SERVICING DATABASE OPERATIONS USING A MESSAGING SERVER

(71) Applicant: Red Hat, Inc., Raleigh, NC (US)

(72) Inventor: Richard Allen Megginson, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 702 days.

This patent is subject to a terminal disclaimer.

(21) Appl. No.: 14/265,706

(22) Filed: Apr. 30, 2014

(65) Prior Publication Data

US 2014/0237009 A1 Aug. 21, 2014

Related U.S. Application Data

(63) Continuation of application No. 12/814,678, filed on Jun. 14, 2010, now Pat. No. 8,719,338.

(51) Int. Cl.
*G06F 17/30* (2006.01)

(52) U.S. Cl.
CPC .. *G06F 17/30194* (2013.01); *G06F 17/30589* (2013.01)

(58) Field of Classification Search
CPC ................................................ G06F 17/30194
See application file for complete search history.

(56) References Cited

U.S. PATENT DOCUMENTS

| | | | |
|---|---|---|---|
| 6,247,017 B1 | 6/2001 | Martin | |
| 7,139,973 B1 | 11/2006 | Kirkwood et al. | |
| 7,203,687 B2 | 4/2007 | Adiba et al. | |
| 7,284,043 B2 | 10/2007 | Feinleib et al. | |
| 7,668,902 B2 | 2/2010 | Harjanto | |
| 7,788,224 B2 | 8/2010 | Fleck et al. | |
| 8,037,023 B2 | 10/2011 | Liu et al. | |
| 8,301,595 B2 | 10/2012 | Megginson | |
| 8,301,718 B2 | 10/2012 | Macken | |
| 8,595,380 B2 | 11/2013 | Megginson | |
| 8,719,338 B2 | 5/2014 | Megginson | |
| 2005/0203993 A1 | 9/2005 | Grobman et al. | |
| 2006/0173873 A1* | 8/2006 | Prompt | G06F 17/30569 |
| 2010/0063961 A1 | 3/2010 | Guiheneuf et al. | |

(Continued)

OTHER PUBLICATIONS

Bogdan Carstoiu, Dorin Carstoiu, "A new grid caching system based on AMQP protocol", 2008, IADIS International Conference, pp. 473-477.* USPTO Office Action for U.S. Appl. No. 12/638,710 dated Apr. 17, 2013.
USPTO Office Action for U.S. Appl. No. 12/638,710 dated Jan. 15, 2013.

(Continued)

*Primary Examiner* — Hua Fan
(74) *Attorney, Agent, or Firm* — Lowenstein Sandler LLP

(57) ABSTRACT

A client computing system publishes a database operation request to a global exchange on an advanced message queuing protocol (AMQP) server, wherein the database operation request identifies an operation to be performed on a database using a different application layer protocol. The client computing system obtains database operation result data from a client queue, on the AMQP server, that corresponds to the client computing system in response to publishing the database operation request and converts the database operation result data from a wire level format to a data format for the different application layer protocol.

15 Claims, 8 Drawing Sheets

(56) References Cited

U.S. PATENT DOCUMENTS

| | | |
|---|---|---|
| 2010/0088187 A1* | 4/2010 | Courtney ............... G06Q 30/02 |
| | | 705/14.73 |
| 2011/0125823 A1 | 5/2011 | Macken |
| 2011/0145320 A1 | 6/2011 | Megginson |
| 2011/0153563 A1 | 6/2011 | Fitterer et al. |
| 2011/0161929 A1 | 6/2011 | Keating |
| 2011/0307443 A1 | 12/2011 | Megginson |
| 2011/0307543 A1 | 12/2011 | Megginson |
| 2013/0054525 A1 | 2/2013 | Megginson |

OTHER PUBLICATIONS

USPTO Notice of Allowance for U.S. Appl. No. 12/638,710 dated Jul. 25, 2013.
USPTO Notice of Allowance and Fees Due for U.S. Appl. No. 12/814,671 dated Jun. 22, 2012.
USPTO Notice of Allowance and Fees Due for U.S. Appl. No. 12/814,671 dated Feb. 22, 2012.
USPTO Office Action for U.S. Appl. No. 13/662,806 dated Sep. 30, 2013.
USPTO Notice of Allowance for U.S. Appl. No. 13/662,806 dated Feb. 19, 2014.
USPTO Office Action for U.S. Appl. No. 12/814,678 dated Jul. 27, 2012.
USPTO Office Action for U.S. Appl. No. 12/814,678 dated Apr. 18, 2012.
USPTO Notice of Allowance for U.S. Appl. No. 12/814,678 dated Dec. 23, 2013.

* cited by examiner

US 10,235,384 B2

SERVICING DATABASE OPERATIONS USING A MESSAGING SERVER

RELATED APPLICATION

The present application is a continuation of U.S. patent application Ser. No. 12/814,678, filed Jun. 14, 2010, the entire contents of which are hereby incorporated by reference herein.

TECHNICAL FIELD

Embodiments of the present invention relate to database operations. Specifically, the embodiments of the present invention relate to a method and system for servicing database operations using an advanced message queuing protocol (AMQP) server.

BACKGROUND

Many enterprises implement a directory service to store and manage enterprise data, such as user data, user account data, group data, etc. The directory service can be hosted by a directory server and can store the enterprise data using a directory for all of the information in a single, network-accessible repository. The directory can be a directory that uses a lightweight directory access protocol (LDAP). The enterprise data in a LDAP based directory may be replicated among a number of directory servers.

Various database operations, such as search and update operations, can be performed on the enterprise data stored in the LDAP based databases. For example, the databases may store user contact information and a user may use a client to search the contact information for entries that have a zip code of 94085. In another example, the databases may store a telephone number for Joe Smith and a user may use a client to update the data for Joe Smith with a new telephone number.

Clients, which are compatible with the LDAP, can communicate directly with the directory servers to send a search or an update request to the directory servers and to receive request results directly from a directory server. However, a directory service environment that requires each directory server to communicate directly with each LDAP compatible client can restrict the resources of the servers and the clients, which can negatively affect the performance of the servers and the clients. In addition, a directory service environment where each directory server communicates with each LDAP compatible client is not easily scalable and can limit the number of directory servers and clients that can be deployed in the environment. When the resources of the directory servers and the clients reach a maximum capacity, a system administrator cannot easily scale the directory service environment. Moreover, not all clients are compatible with the lightweight directory access protocol. Such clients, which are not LDAP compatible, may not easily send an update request or search request to a directory server, nor may they easily obtain operation results from a directory server.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for servicing database operations using an advanced message queuing protocol (AMQP) server. A message-based directory system obtains a database operation request from a global queue on an advanced message queuing protocol (AMQP) server. The database operation request identifies an operation to be performed on a lightweight directory access protocol (LDAP) based database. The system performs the operation on a LDAP based database that is coupled to the system based on the database operation request to generate the database operation result data and publishes the database operation result data to a client exchange that corresponds to a client that published the database operation request to allow the client access to the database operation result data.

Embodiments of the present invention allow directory servers and clients to use an AMQP server to service database operations pertaining to LDAP based databases. Using an AMQP server to service database operations reduces the burden placed on the directory servers and the clients, and enhances the scalability of the number of directory servers and clients that can be deployed in a directory service environment. In addition, embodiments of the present invention enable clients that are not LDAP compatible to use an AMQP server to submit database operation requests and to obtain operation results from a directory server.

Figure 1:
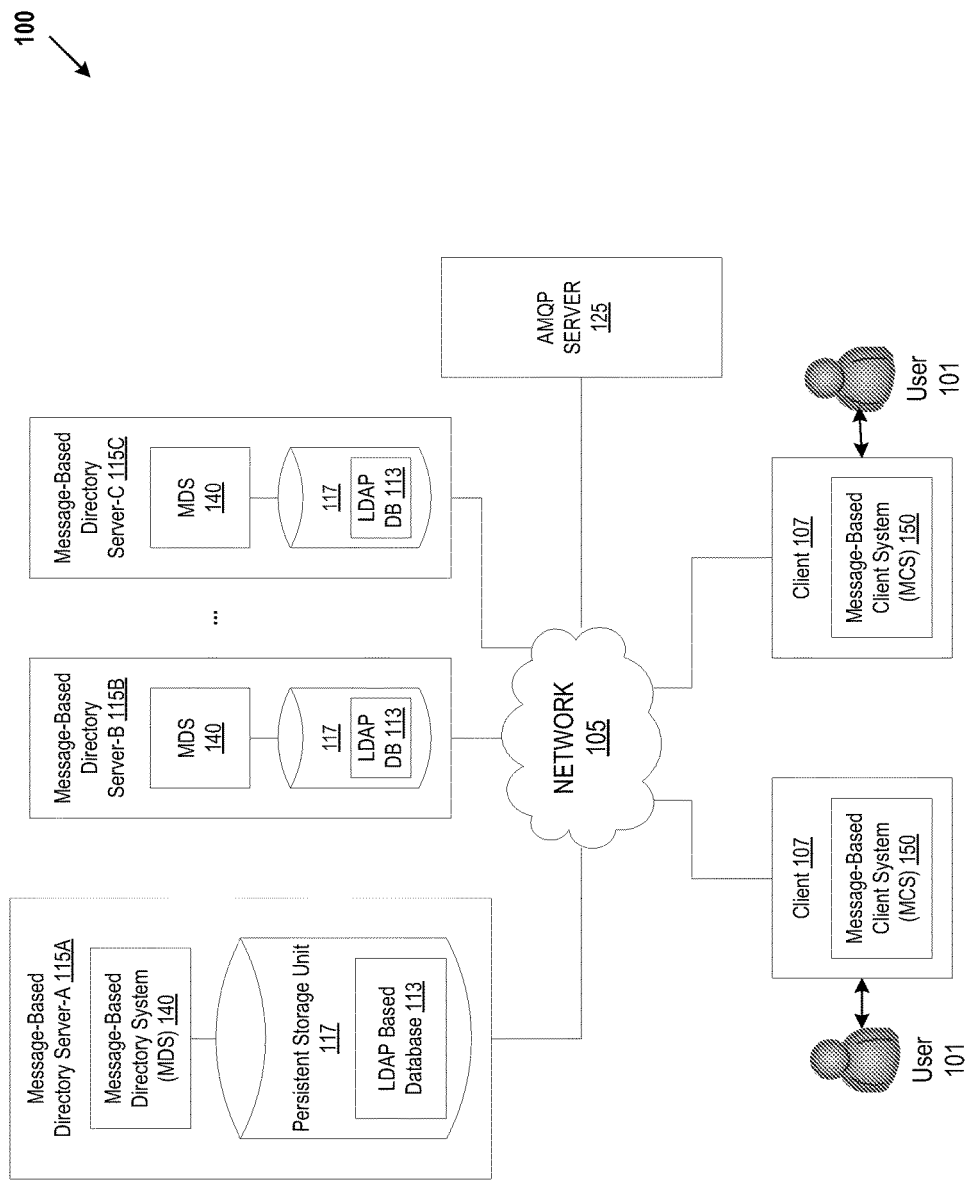
FIG. 1 illustrates an exemplary network architecture in which embodiments of the present invention may operate.

FIG. 1 illustrates an exemplary network architecture 100 on which embodiments of the present invention can be implemented. The architecture 100 includes one or more directory servers 115A-C that host a directory service to store data using network 105. A directory server 115A-C can be any type of computing device including server computers, desktop computers, laptop computers, gateway computers, or similar computing device. The network 105 can be a public network (e.g., Internet) or a private network (e.g., a local area network (LAN)).

The network architecture 100 can include an advanced message queuing protocol (AMQP) server 125 that hosts a publisher/subscriber messaging service. AMQP is an open Internet Protocol for messaging that uses a wire level protocol. The AMQP server 125 allows publishers to distribute data to AMQP subscribers. An AMQP server 125 can be any type of computing device including server computers, desktop computers, laptop computers, gateway computers, or similar computing device.

A directory server 115A-C can store enterprise data, such as user data, user account data, group data, etc., in a persistent storage unit 117 using a directory that stores all of the information in a single, network-accessible repository. The repository can be a lightweight directory access protocol (LDAP) based repository, such as a LDAP based database 113. A database may represent any type of data storage including, for example, relational or hierarchical databases, flat files, application or shared memory, etc. However, it is expressly contemplated that any appropriate directory and directory service can be enhanced for use in accordance with the architecture described herein. A persistent storage unit can be a local storage unit or a remote storage unit. Persistent storage units can be a magnetic storage unit, optical storage unit, solid state storage unit, electronic storage unit (main memory), or similar storage unit. Persistent storage units can be a monolithic device or a distributed set of devices. A 'set,' as used herein, refers to any positive whole number of items.

Various database operations, such as database search operations and database update operations, can be performed on the enterprise data stored in the LDAP based databases 113. For example, the LDAP based databases 113 may store user contact information. A user 101 may use a client 107 to search the contact information for entries that have a zip code of 94085. In another example, the LDAP based databases 113 may store a telephone number of (555) 555-1234 for Joe Smith and a user 101 may use a client 107 to update the user data for Joe Smith with a new telephone number of (555) 555-5678.

The network architecture 100 can include clients 107 that are LDAP based clients and non-LDAP based clients. A LDAP based client is a client that is compatible with the lightweight directory access protocol and can send database operation requests to a directory server 115A-C using LDAP and can receive database operation results from a directory server 115A-C using LDAP. A non-LDAP based client is a client that is using a protocol that is not compatible with LDAP and cannot directly communicate with a directory server 115A-C. Both LDAP based clients and non-LDAP based clients can include a message-based client system (MCS) 150 for communicating with an AMQP server 125 for sending database operation requests to a directory server 115A-C and for receiving database operation results from a directory server 115A-C.

Although a LDAP based client can use LDAP to communicate with a directory server 115A-C for servicing database operations, the message-based client system 150 and the AMQP server 125 allow a user, such as a system administrator, to increase the scalability of the directory service environment. Having both LDAP based clients and non-LDAP based clients including a message-based client system 150 allows a user to increase the number of clients 107 and directory servers 115A-C deployed in a directory service environment. A client 107 can be a smart hand-held device or any type of computing device including desktop computers, laptop computers, mobile communications devices, cell phones, smart phones, hand-held computers or similar computing device.

The message-based client system 150 allows a client 107 to publish database operation requests to the AMQP server 125 and to subscribe to the messaging service hosted by the AMQP server 125 to obtain database operation results.

A directory server 115A-C can include a message-based directory system (MDS) 140 to allow the directory server 115A-C to subscribe to the messaging service hosted by the AMQP server 125 to obtain a database operation request that is published by a client 107 and to provide database operations results to the client. A directory server 115A-C that includes a message-based directory system 140 is hereinafter referred to as a message-based directory server. Using an AMQP server 125 to service databases operations can help minimize the burden placed on the resources of the message-based directory servers 115 and clients 107 and can enhance the scalability of the number of directory servers 115 and clients 107 that can be deployed in a directory service environment. In one embodiment, the AMQP server 125 resides on a separate machine from a message-based directory server 115A-C. In another embodiment, the AMQP server 125 and a message-based directory server 115A-C may be hosted by the same machine.

Figure 2:
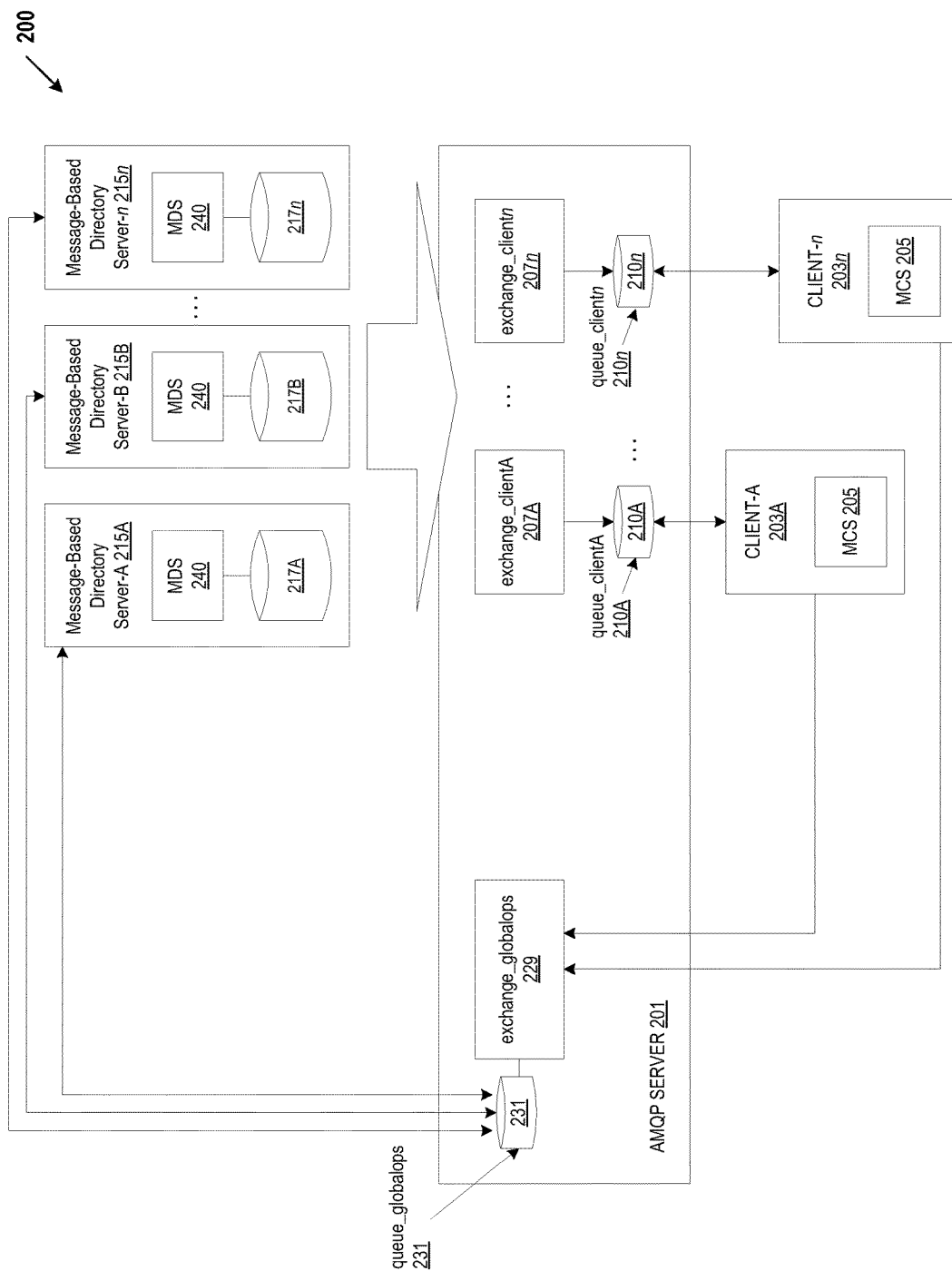
FIG. 2 is a block diagram of one embodiment of a system including an AMQP server for servicing database operations.

FIG. 2 is a block diagram of one embodiment of a system 200 for servicing database operations using an AMQP server 201. The AMQP server 201 hosts a messaging service that allows publishers to publish messages which are distributed to the subscribers of the AMQP server 201 messaging service. For example, clients **203A-*n* are publishers that can publish database operation request messages to the AMQP server 201 that describe database operations to be performed on a LDAP based database 217A-*n*, such as database searches and database updates. Message-based directory servers 215A-*n* are also publishers to the AMQP server 201 and can publish database operation result messages that describe database operation results, such as database search results. The messaging service hosted by the AMQP server 201 allows messaging service subscribers to obtain messages from the AMQP server 201. For example, message based directory servers 215A-*n* can subscribe to the AMQP server 201 messaging service to obtain database operation request messages (e.g., database search requests) that are published by clients 203A-*n*. Clients 203A-*n* can also subscribe to the AMQP server 201 messaging service to obtain database operation results messages (e.g., database search results) that are published by message-based directory servers 215A-*n*. Clients 203 include a message-based client system 205 for communicating with the AMQP server 201. One embodiment of the message-based client system is described in greater detail below in conjunction with FIG. 3. Message-based directory servers 215A-*n* include a message-based directory system 240 for communicating with the AMQP server 201. One embodiment of the message-based directory system is described in greater detail below in conjunction with FIG. 4**.

The AMQP specification includes components, such as an exchange, a queue, and bindings. An exchange can receive messages to be published from AMQP publishers. An example of a message to be published is a database operation request message that includes data describing a database operation to be performed on a LDAP based database **217A-*n*. Another example of a message is a database operation result message that includes data describing the result of a database operation performed on a LDAP based database 217A-*n***.

A user, such as a system administrator, can provide user input to the AMQP server 201 to create an exchange, such as exchange_globalops 229, for clients **203A-*n* to publish database operation request messages. An exchange that allows the clients in a directory service environment to publish database operation requests is hereinafter referred to as a global exchange. A user can also provide user input to the AMQP server 201 to create an exchange for each client 203**A-*n* in a directory service environment to allow directory servers 215A-*n* to publish database operation result messages for respective clients 203A-*n*. An exchange that allows directory servers to publish database operation result data is hereinafter referred to as a client exchange. For example, for clients, client-A 203A to client-n 203*n* in a directory service environment, the AMQP server 201 creates client exchanges, exchange_clientA 207A to exchange_clientn 207*n*.

The AMQP server 201 can provide a list of available exchanges to a user through a user interface and the user can select an exchange to configure a particular system (e.g., client 203A-*n*, directory server 215A-*n*) as a publisher for that exchange. An exchange can have more than one publisher. For example, client-A 203A to client-n 203*n* can be publishers for the global exchange, exchange_globalops 229, to publish database operation requests to the AMQP server 201. In another example, directory server-A 215A to directory server-n 215*n* can be publishers to each of the client exchanges, exchange_A 207A to exchange_n 207*n* to publish database operation result data.

An exchange can be bound to one or more corresponding queues that store messages that are published to the exchange. In one embodiment, a global exchange, such as exchange_globalops 229, is bound to one queue that stores the database operation requests. A queue that stores the database operation requests is hereinafter referred to as a global queue. For example, the AMQP server 201 creates a global queue, queue_globalops 231, for storing the database operation requests. In one embodiment, a client exchange, such as exchange_clientA 207A, is bound to one queue that stores database operation result data for a particular client. A queue that stores database operation result data for a client is hereinafter referred to as a client queue. For example, the AMQP server 201 creates a client queue 210A-*n* for each client exchange 207A-*n*. When an exchange receives a message from a publisher, the exchange can route the message to a queue based on the properties of the message or the content of the message. Bindings define the relationship between a queue and an exchange and provide the routing criteria.

A queue can be a shared queue having more than one subscriber. For example, the global queue, queue_globalops 231, has a number of directory servers 215A, B, n as subscribers. Any client 203A-*n* that includes a message-based client system 205 can publish a database operation request to the global exchange 229A-*n*, and the global exchange 229A-*n* can route the database operation request message to the global queue (e.g., queue_globalops 231). The global queue (e.g., queue_globalops 231) can store the database operation request until one of the subscribing directory servers 215A-*n* can obtain the database operation request from the queue (e.g., queue_globalops 231) and process it accordingly.

A queue can have one subscriber. For instance, a client queue 210A-*n* can have one client 203A-*n* as a subscriber for obtaining database operation result data. For example, queue_clientA 210A has one subscriber, client-A 203A. Client-A published a database operation request to the exchange_globalops 229 to search for user data in a LDAP based database that includes a zip code of 94085. The exchange_globalops 229 routes the operation request to queue_globalops 231. Directory server-B 215B obtains the search request from the queue_globalops 231 and performs the search operation. Directory server-B 215B publishes the database operation search result data to the client exchange for client-A, exchange_clientA 207A. The exchange_clientA 207A routes the search results to queue_clientA 210A. The queue_clientA 210A can store the search results until its subscriber, client-A 203A can obtain the search results from the client queue 210A. A queue can store a message until a subscriber can obtain the message.

Figure 3:
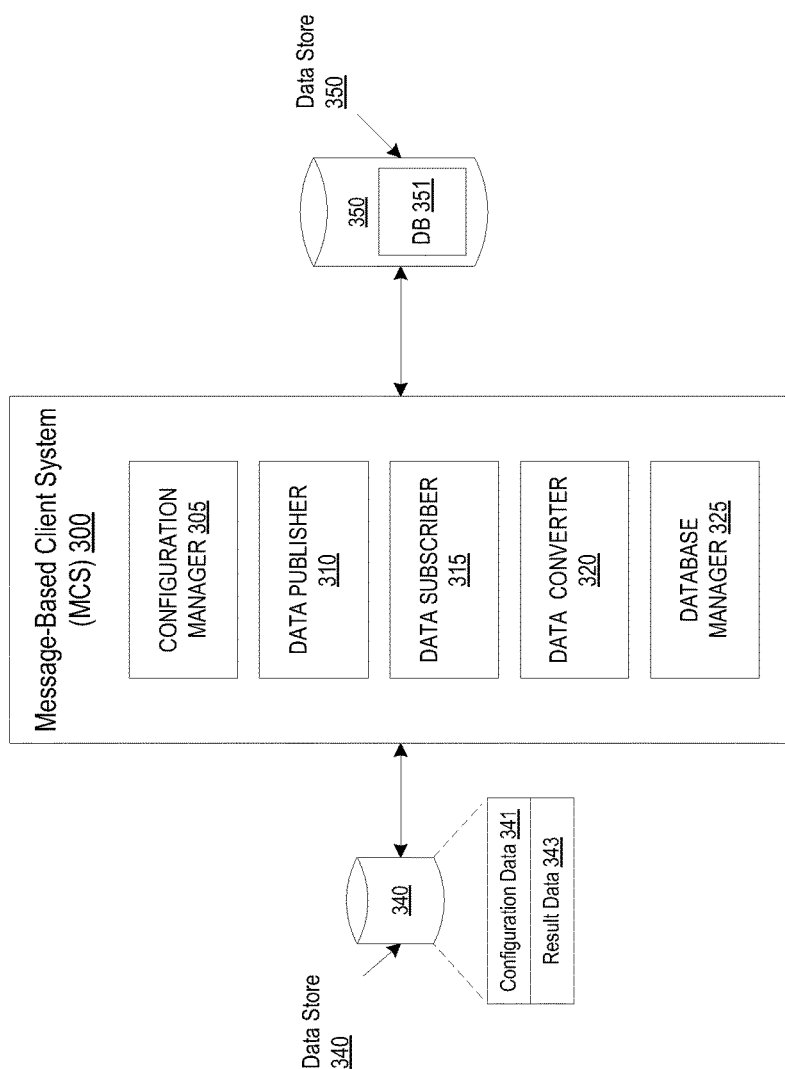
FIG. 3 is a block diagram of one embodiment of a message-based directory system for servicing database operations using an AMQP server.

FIG. 3 is a block diagram of one embodiment of a message-based client system 300 for publishing database operation requests and obtaining database operation results using an AMQP server. The message-based client system 300 includes a configuration manager 305, a data publisher 310, a data subscriber 315, a data converter 320, and a database manager 325.

The configuration manager 305 can configure communication with an AMQP server to publish database operation request messages to a global exchange on the AMQP server, such as exchange_globalops 229 in FIG. 2. A database operation request message (request message) is a message that describes a database operation to be performed on a LDAP based database, such as a search operation, update operation, etc. The request messages that are published in the global exchange (e.g., exchange_globalops) are made available to one or more directory servers. The configuration manager 305 can store configuration data 341 in a data store 340 that is coupled to the message-based client system 300 that associates request messages prepared by a client with the global exchange.

The configuration manager 305 can configure communication with an AMQP server to subscribe to a client queue hosted by the AMQP server for obtaining database operation result messages that are stored in the client queue. A database operation result message (result message) is a message that describes the results of a database operation performed on a LDAP based database, such as search results, update results, etc. A client queue can store the result messages for a client and the configuration manager 305 can configure communication with the AMQP server to subscribe to the queue that is associated with the client to obtain the result messages for the client. For example, client-A can be configured as a subscriber to queue_clientA.

The data publisher 310 can prepare a database operation request message to be published in the global exchange. The data publisher 310 can associate the prepared request message with the global exchange and publish the request message to the global exchange. The data publisher 310 can associate the request message with the global exchange by examining the configuration data 341 stored in the data store 340.

Prior to publishing the request message, the data publisher 310 can format the request message in a wire level data format. AMQP is an open Internet Protocol for messaging that uses a wire level protocol. Examples of wire level data formats can include and are not limited to a Qpid data format, directory services markup language (DSML) format, and LDAP data interchange format (LDIF). However, it is expressly contemplated that any appropriate wire level data format can be used in accordance with the database operation architecture described herein.

The data subscriber 315 can obtain database operation result data from a client queue hosted by the AMQP server (e.g., queue_clientA). Database operation result data can include a result message that describes the results of a database operation performed on a LDAP based database. A client queue can store a result message until the subscribing client can obtain the result message. An AMQP server can deliver (push) a result message that is stored in a client queue to the data subscriber 315. Alternatively, the data subscriber 315 can receive a notification from the AMQP server that a result message is stored in a corresponding client queue and the data subscriber 315 can receive (pull) the result message from the client queue.

A result message that is obtained from the AMQP server is in a wire level data format. The data converter 320 can convert result data in the result message from a wire level format to, for example, LDAP data format or any other data format that is compatible with the client. The database manager 325 can process the converted result data. For example, the database manager 325 can process database search results to present the search results to a user. In another example, the database manager 325 can replicate an update made to a LDAP based database to a local database 351 that is stored in a data store 350 using the converted result data. The database manager 325 can store the result data 343, including the converted result data, in the data store 340.

Figure 4:
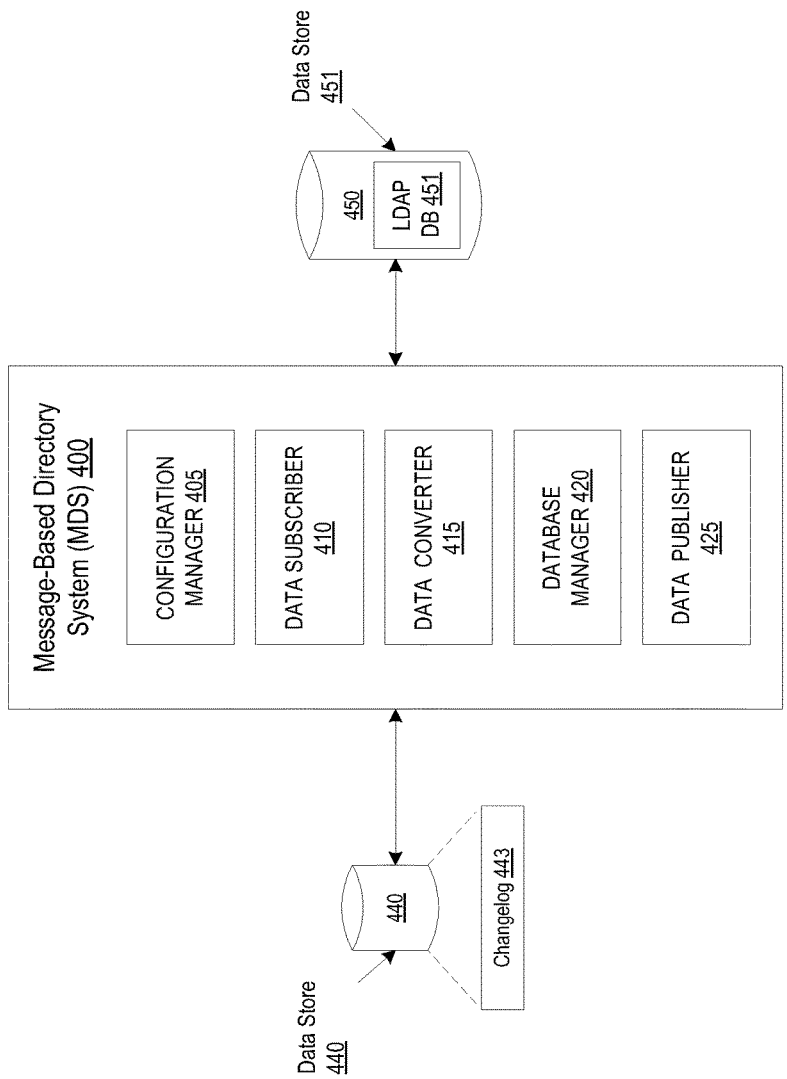
FIG. 4 is a block diagram of one embodiment of a message-based client system for servicing database operations using an AMQP server.

FIG. 4 is a block diagram of one embodiment of a message-based directory system 400 for servicing database operations using an AMQP server. The system 400 includes a configuration manager 405, a data subscriber 410, a data converter 415, a database manager 420, and a data publisher 425.

The configuration manager 405 can configure communication with an AMQP server to publish database result data to one or more client exchanges on the AMQP server, such as exchange_clientA 207A to exchange_clientn 207n in FIG. 2. Database operation result data can include a result message that describes the results of a database operation performed on a LDAP based database. The result messages that are published in a client exchange are made available to the subscribing client. The configuration manager 405 can configure communication with an AMQP server to subscribe to a global queue hosted by the AMQP server for obtaining database operation request messages that are stored in the global queue. For example, the configuration manager 405 can configure a directory server to be a subscriber of queue_globalops.

The data subscriber 410 can obtain database operation requests from the global queue (e.g., queue_globalops). The global queue can store a request message until one of the subscribing directory servers can obtain the request message. The data subscriber 410 can receive a notification from the AMQP server that a request message is stored in the global queue and the data subscriber 410 can 'read' (e.g., receive, pull) the request message from the global queue. An AMQP server can detect that a subscribing directory server has read a request message and can remove the request message from the global queue.

A request message that is obtained from the AMQP server is in a wire level data format. The data converter 415 can convert request data in a request message from a wire level format to LDAP data format. The database manager 420 can use the converted request data to perform the database operation on the LDAP based database 451 that is stored in a data store 450, which is coupled to the message-based directory system 400, and generate database operation result data. For example, the database manager 420 can use the converted request data to perform a database search operation to generate search results or perform an update operation and generate update results.

A database operation request (request message) can include the desired operation (e.g., search, update) to be performed, parameters for the operation (e.g., search criteria, fields to update, etc.), and additional data for result instructions (e.g., a destination exchange, a destination queue for storing operation result data, routing instructions, etc.). A database operation request data is described in one embodiment in greater detail below in conjunction with FIG. 5.

The database manager 420 can examine the request data in the request message to determine whether the requested database operation to be performed is a request to update a LDAP based database. The database manager 420 can store data that describes an update made to a LDAP based database in a changelog 443 in the data store 440. The database manager 420 can include an indicator in the changelog 443 that indicates that the update request was received from an AMQP server. In one embodiment, the message-based directory system 400 can replicate an update made to a LDAP based database to other directory servers using the AMQP server and using replication agreements. An indicator that represents that an update request was received from an AMQP server allows the message-based replication system 400 to determine that it does not need to republish the update to the AMQP server since the update request was already obtained from the AMQP server. Co-pending patent application Ser. No. 12/814,671 entitled "Using AMQP for Replication" describes a method and system for replicating database updates to other directory servers using an AMQP server.

The data publisher 425 can prepare a database operation result message to be published in a client exchange (e.g., exchange_clientA). A database operation result message is described in one embodiment in greater detail below in conjunction with FIG. 6. A database operation request can specify a client exchange for publishing database operation result data. The data publisher 425 can identify a client exchange from the request and can publish the result message to the client exchange that is specified in the database operation request. The data publisher 425 can format the result message in a wire level data format, such as a Qpid data format, DSML format, and LDIF.

Figure 5:
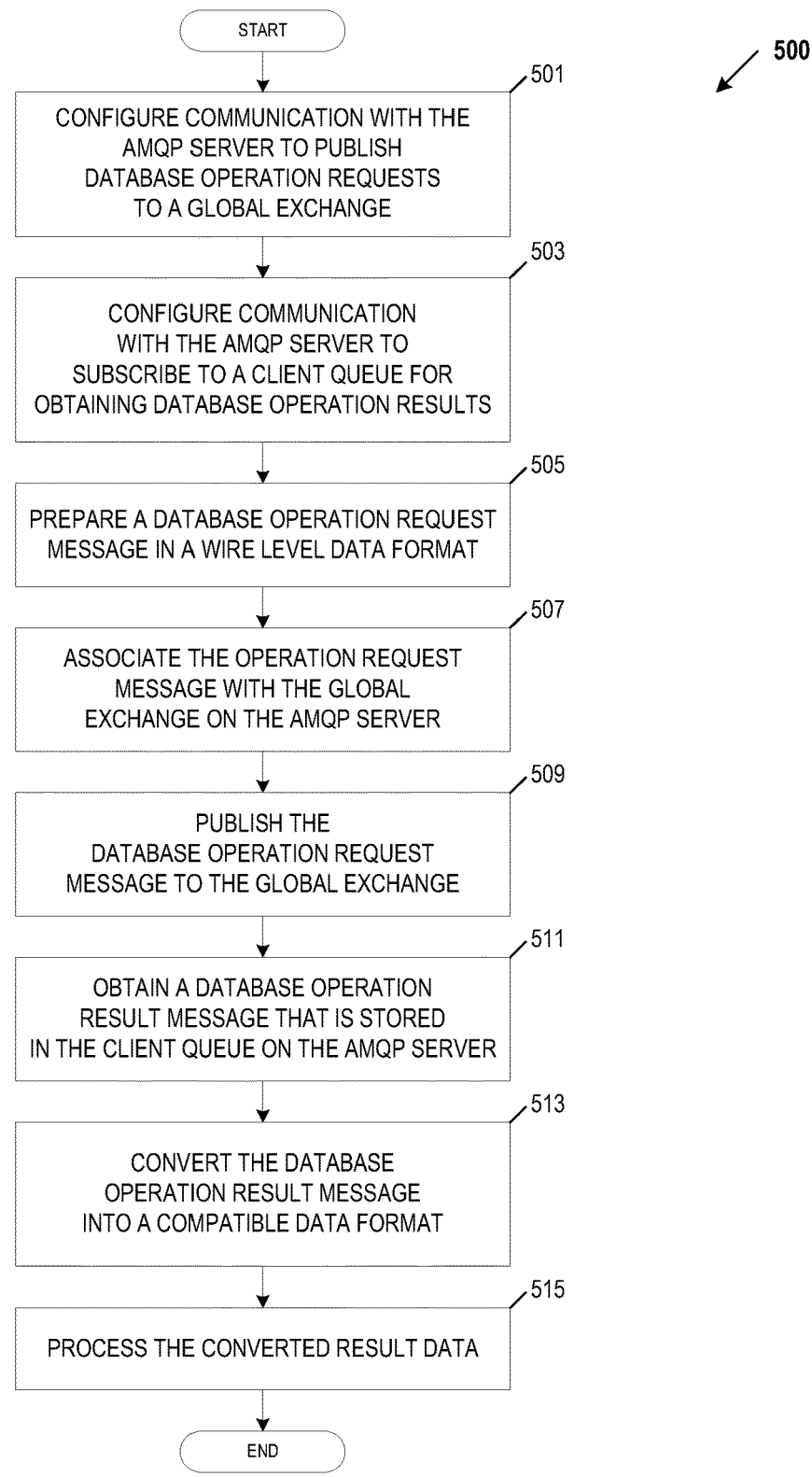
FIG. 5 is a flow diagram of one embodiment of a method for requesting database operations and obtaining results using an AMQP server.

FIG. 5 is a flow diagram which illustrates an embodiment of a method 500 for requesting database operations and obtaining results of the database operations using an AMQP server. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the message based client system 150 in a client 107 of FIG. 1.

In one embodiment, a user, such as a system administrator, sets up a global exchange (e.g., exchange_globalops) on an AMQP server to allow clients to publish database operation request messages to the global exchange.

At block 501, the message-based client system configures communication with an AMQP server to send (publish) database operation request messages (request messages) to the global exchange. An AMQP server can provide the available exchanges to the message-based client system. The system can receive user input of the selection of an exchange for publishing request messages.

At block 503, the system configures communication with the AMQP server to subscribe to a client queue for obtaining database operation result data (result messages) that is stored in the client queue. For example, a system administrator creates exchange_clientA to exchange_clientn and queue_clientA to queue_clientn, which respectively correspond to the client exchanges, and the system subscribes to one of the client queues.

A LDAP based database can store enterprise data, such as user data, user account data, group data, etc. A user may use a client to send a database operation request to the directory servers via an AMQP server. Examples of database operation requests include, and are not limited to, a search of a LDAP based database and an update (change) to the data in a LDAP based database. An update can represent a change made or to be made to a LDAP based database (e.g., add entry, delete entry, rename entry, modify entry, such as name changes, email address changes, telephone number changes, social security number changes, etc.).

At block 505, the system prepares a database operation request message in a wire level data format, such as a Qpid data format, DSML format, and LDIF. Database operation requests can include a database operation request message that contains the desired operation (e.g., search, update) to be performed, parameters for the operation (e.g., search criteria, fields to update, etc.), and additional data for result instructions (e.g., a destination client exchange, routing instructions, etc.).

For example, a user may wish to update a database entry attribute. At block 505, the system can prepare a database operation request message that includes data identifying the operation as an update operation, the parameters (e.g., an entry identifier, a list of object classes for the entry, data that represents an entire database entry), an identifier that specifies a destination client exchange for publishing result data, and routing instructions. The parameter data that represents an entire database entry includes changed and un-changed entry attributes. For example, a database entry may include three attributes: a name, a telephone number, and an email address. Even if only the telephone number attribute has changed for an entry, the system can prepare a database operation request that includes the entire entry (e.g., the unchanged name, the changed telephone number, and the unchanged email address).

In another example, a user may request to delete a database entry. At block 505, the system can prepare a request message that includes data identifying the operation as an update operation, the parameters (e.g., an entry identifier with an empty attribute list), an identifier that specifies a destination client exchange for publishing result data, and routing instructions.

At block 507, the system associates the database operation request message with the global exchange on the AMQP server (e.g., exchange_globalops), and publishes the request message to the global exchange at block 509. The system can associate the request message with the global exchange by examining configuration data that is stored in a data store coupled to the system.

A directory server may obtain the request message, process the requested database operation, and publish database operation result data to the AMQP server. At block 511, the system detects that a database operation result message is stored in the client queue and obtains the result message from the client queue. For example, the system may receive a notification from the AMQP server that the database operation result message is stored in the client queue and can receive (pull) the result message from the queue. Alternatively, the AMQP server can deliver (push) the result message that is stored in the client queue to the system.

The result message is in a wire level data format. At block 513, the system can convert result data that is in the result message from a wire level format to, for example, LDAP data format or any other data format that is compatible with the client. At block 515, the system can process the converted result data. For example, the system can process database search results to present the search results to a user. In another example, the system can replicate an update made to a LDAP based database to a local database that is coupled to the system using the converted result data. The system can store the result data, including the converted result data, in the data store.

Figure 6:
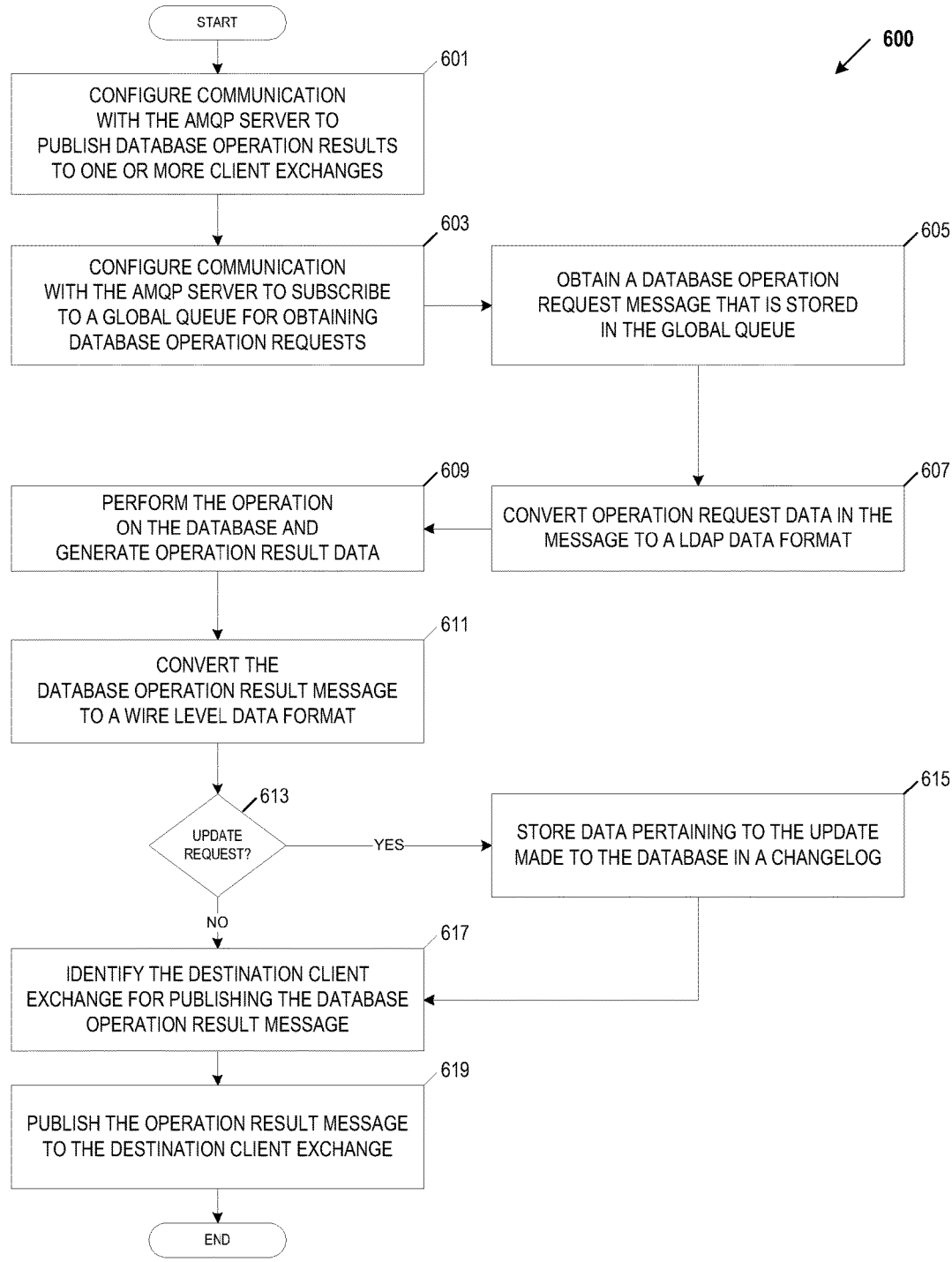
FIG. 6 is a flow diagram of one embodiment of a method for servicing database operations using an AMQP server.

FIG. 6 is a flow diagram which illustrates an embodiment of a method 600 for servicing database operations using an AMQP server. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the message-based directory system 140 in a directory server 115A-C of FIG. 1.

In one embodiment, a user, such as a system administrator, sets up a client exchange for one or more clients, which are in a directory service environment, on an AMQP server to allow directory servers to publish database operation result messages to the client exchanges. At block 601, the message-based directory system configures communication with an AMQP server to send (publish) database operation result data (result messages) to any one of the client exchanges on the AMQP server. An AMQP server can provide the available client exchanges to the message-based directory system and the system can receive user input of the selection of the client exchanges to configure for publishing database operation result messages.

At block 603, the system configures communication with the AMQP server to subscribe to a global queue hosted by the AMQP server for obtaining database operation requests (request messages) that are stored in the global queue. For example, a user can provide user selection of a global queue, such as queue_globalops, which stores request messages, and the system can configure communication with the AMQP server to subscribe to the global queue for obtaining the request messages.

At block 605, the system detects that a database operation request (request message) is stored in the global queue and obtains the request message from the global queue. A request message may be read by one of the directory servers that subscribe to the global queue. The message-based directory system may receive a notification from the AMQP server that a request message is stored in the global queue and can read (pull, receive) the request message from the shared queue. When the AMQP server detects that a request message is read, the AMQP server can remove the request message from the global queue.

The request message is in a wire level data format. At block 607, the system can convert request data that is in the request message from a wire level format to LDAP data format in order to perform the requested database operation on a LDAP based database. At block 609, the system performs the requested database operation on a LDAP based database that is coupled to the system and generates database operation result data. Database operation result data can include a message that describes the results of a database operation performed on a LDAP based database.

For example, the system can use the converted request data to perform a database search operation and generate search results. The database operation result data can include a result message that contains zero or more entries that satisfy the search criteria specified in a database operation request message, and data, such as a result code, that indicates whether the search operation was successfully performed. An example of a result code is an error code indicating that the time allotted to perform the search operation has been exceeded and a code indicating that the operation was successfully performed.

In another example, the system can use the converted request data to perform a database update operation on a LDAP based database and generate update results. The database operation result data can include a result message that contains update data and data, such as a result code, that indicates whether the update operation was successfully performed. The update data can include an entry identifier, a list of object classes for the entry, and data that represents an entire database entry.

At block 611, the system converts the database operation result message in a wire level data format, such as a Qpid data format, DSML format, and LDIF. At block 613, the system can examine the request data in the database operation request (request message) to determine whether the requested database operation to be performed is a request to update a LDAP based database. At block 615, the system can store data that describes an update made to the LDAP based database in a changelog that is stored in a data store that is coupled to the system. The system can include an indicator in the changelog data that indicates that the request for the update was received from an AMQP server. In one embodiment, the message-based directory system can replicate an update made to a LDAP based database to other directory servers using the AMQP server and using replication agreements. An indicator that represents that request was received from an AMQP server allows the message-based replication system to determine that it does not need to republish the update to the AMQP server since the data was already obtained from the AMQP server.

At block 617, the system can examine the request data in the database operation request message to determine the destination client exchange for publishing the database operation result message. For example, the database operation request message may specify a destination client exchange as exchange_clientB.

At block 619, the system publishes the database operation result message to the client exchange that is specified in the database operation request. The client exchange can route the result message to the corresponding client queue for the client, such as queue_clientB. The result message is stored in the client queue until the subscribing client can obtain the result message from the queue. For example, client-B published a request message to update the user data for Joe Smith with a new telephone number of (555) 555-5678. Client-B can obtain the result message that includes data indicating whether the change was successfully made from queue_clientB.

Figure 7:
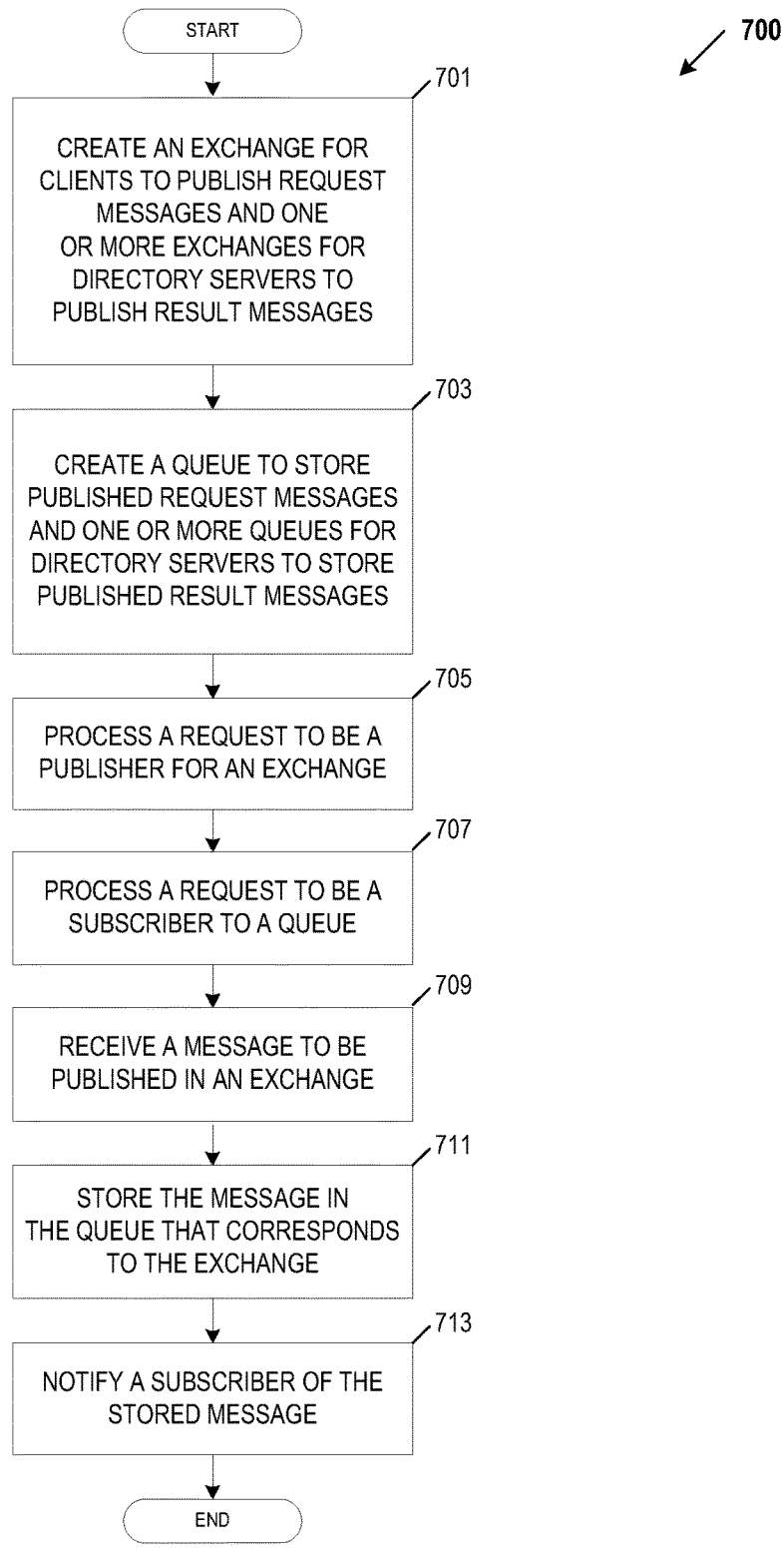
FIG. 7 is a flow diagram of one embodiment of a method for publishing database operation request and results using an AMQP server.

FIG. 7 is a flow diagram which illustrates an embodiment of a method 700 for servicing database operations pertaining to a LDAP based database using an AMQP server. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the AMQP server 125 of FIG. 1.

In one embodiment, the method 700 starts with the AMQP server receiving user input from a user, such as a system administrator, to create one or more exchanges and creates the exchanges at block 701. For example, the server receives input from a system administrator to create a global exchange, such as exchange_globalops, to allow clients in a directory service environment to publish database operation request messages and the server creates the exchange. The server also receives user input to create a client exchange that corresponds to each client, such as exchange_clientA to exchange_clientn, on the AMQP server to allow message-based directory servers to publish result messages that describe database operations performed on LDAP based databases and the server creates the client exchanges.

At block 703, the AMQP server receives user input from the user to create one or more queues and creates the queues. For example, the server receives input from a system administrator to create a global queue that corresponds to the global exchange to store request messages and the server creates the global queue, such as queue_globalops. The server also receives user input to create a client queue that corresponds to each client exchange to store result messages and to allow clients to obtain the result messages, and the server creates the client queues, such as queue_clientA to queue_clientn.

At block 705, the AMQP server receives a request to be a publisher for an exchange and processes the request. For example, the AMQP server receives a request from a client to be a publisher to the global exchange, exchange_globalops. In another example, the AMQP server receives a request from a directory server to be a publisher to each of the client exchanges.

At block 707, the AMQP server receives a request to be a subscriber to a queue and processes the request. For example, the AMQP server receives a request from a client to be a subscriber to a client queue that corresponds to the client, such as queue_clientA, and configures the client to be a subscriber to the client queue. In another example, the AMQP server receives a request from a directory server to be a subscriber to the global queue, queue_globalops, and configures the directory server to be a subscriber to queue_globalops.

At block 709, the AMQP server receives a message that is to be published on an exchange from a publisher. The message can be a database operation request message that describes a database operation (e.g., search, update) to be performed on a LDAP based database that is coupled to a directory server. The message can be a database operation result message that describes the results of a database operation (e.g., search results, update results) performed on a LDAP based database that is coupled to a directory server.

At block 710, the AMQP server routes the received message or a copy of the received message to a queue that corresponds to the exchange. The queue stores the message to allow a subscriber to obtain the message. The AMQP server can route the message to a queue based on routing directions included in the message. For example, the AMQP server routes a request message that describes a database operation to be performed to the global queue, queue_globalops, for one of the subscribing directory server to obtain.

At block 711, the AMQP server can notify the subscribers that subscribe to queue that a message is stored in a queue. A subscriber can receive the notification and obtain the message from the queue. Alternatively, for a client queue which has one subscriber, the AMQP server can send (push) the message that is stored in a queue to the corresponding client subscriber.

Figure 8:
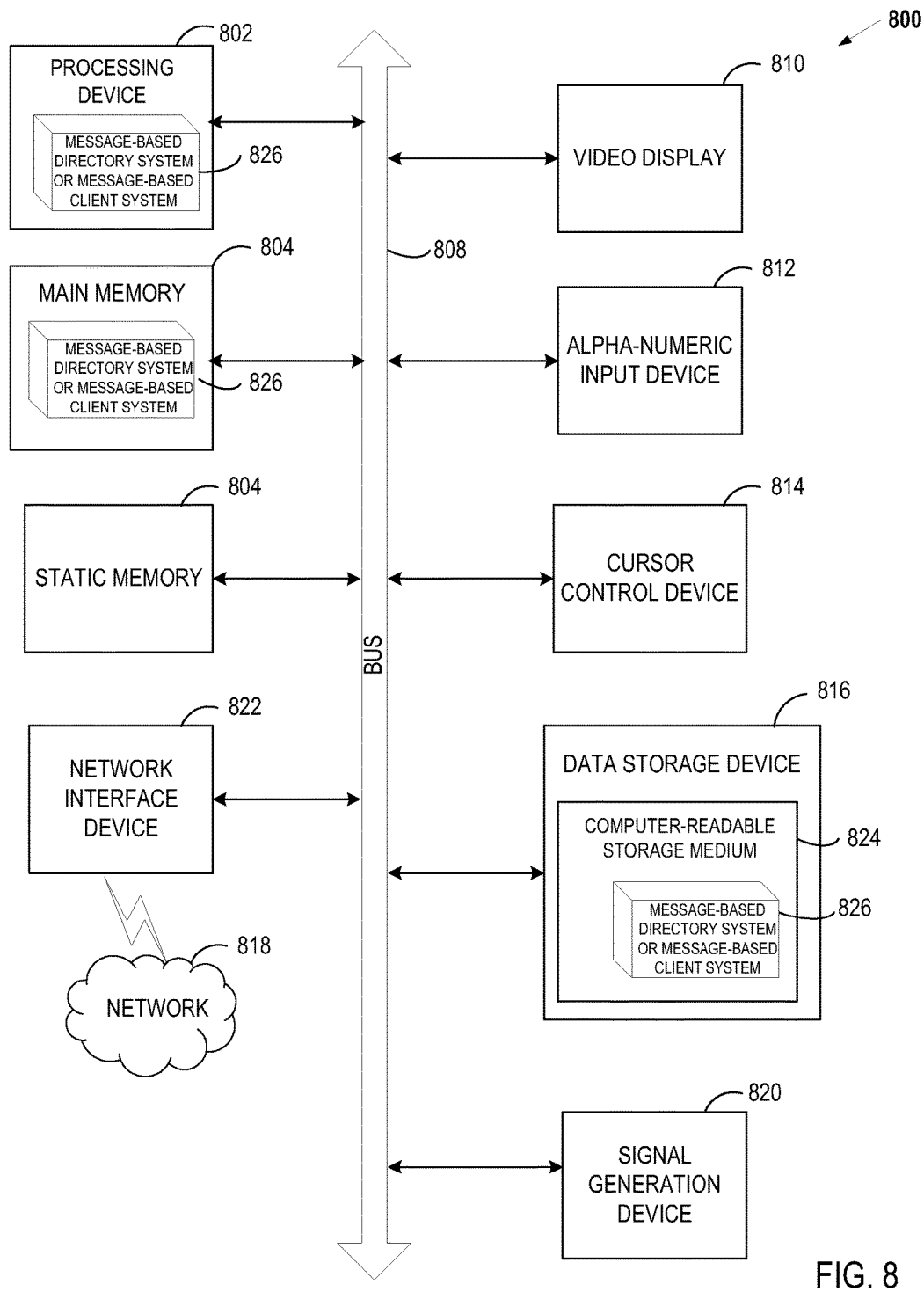
FIG. 8 is a diagram of one embodiment of a computer system for a message-based directory system or a message-based client system.

FIG. 8 is a diagram of one embodiment of a computer system for servicing database operations using an AMQP server. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute a message based directory system or message-based client system 826 for performing the operations and steps discussed herein. The message-based directory system or message-based client system 826 can include the message-based directory system 140 in a directory server 115A-C in FIG. 1. The message-based directory system or message-based client system 826 can include the message-based client system 150 in a client 107 in FIG. 1.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the message-based directory system or message-based client system 826) embodying any one or more of the methodologies or functions described herein. The message-based directory system or message-based client system 826 may also reside, completely or at least partially, within the main memory 804 and/or within the processing device 802 during execution thereof by the computer system 800, the main memory 804 and the processing device 802 also constituting machine-readable storage media. The message-based directory system or message-based client system 826 may further be transmitted or received over a network 818 via the network interface device 822.

The computer-readable storage medium 824 may also be used to store the message-based directory system or message-based client system 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The message-based directory system or message-based client system 826, components and other features described herein (for example in relation to FIG. 3 and FIG. 4) can be implemented as discrete hardware components or integrated in the functionality of hardware components such as ASICS, FPGAs, DSPs or similar devices. In addition, the message-based directory system or message-based client system 826 can be implemented as firmware or functional circuitry within hardware devices. Further, the message-based directory system or message-based client system 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining," "performing," "publishing," "subscribing," "configuring," "converting," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for servicing database operations using an AMQP server. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    subscribing, by a client computing system, to a client queue on an advanced message queuing protocol (AMQP) server to obtain database operation result messages that pertain to operations performed on a lightweight directory access protocol (LDAP) based database maintained on a directory server;
    publishing, by the client computing system, a database operation request to a global exchange on the AMQP server, wherein the database operation request identifies an operation to be performed on the LDAP based database, wherein the client computing system is not compatible with LDAP;
    obtaining, by the client computing system, database operation result data from the database operation result messages in the client queue that corresponds to the client computing system in response to publishing the database operation request, wherein the AMQP server pushes the database operation result messages comprising the database operation result data to the client computing system in response to the client computing system having subscribed to the client queue; and
    converting, by the client computing system, the database operation result data from a wire level format to a data format that is compatible with the client computing system.

2. The method of claim 1, wherein the database operation request specifies a client exchange for publishing database operation result data, the client exchange corresponding to the client queue for allowing the client computing system access to the database operation result data.

3. The method of claim 1, further comprising:
    configuring communication with the AMQP server to publish database operation requests to the global exchange, the global exchange having a corresponding global queue that has a plurality of directory servers as subscribers.

4. The method of claim 1, wherein the database operation request comprises a search request and the database operation result data comprises one or more entries that satisfy search criteria in the database operation request and a result code that indicates whether the search operation succeeded.

5. The method of claim 1, wherein the database operation request comprises a request to update an entry in the LDAP based database and the database operation result data comprises a result code that indicates whether the update operation succeeded.

6. A non-transitory computer-readable storage medium storing instructions which, when executed, cause a processing device to:
    subscribe, by the processing device in a client computing system, to a client queue on an advanced message queuing protocol (AMQP) server to obtain database operation result messages that pertain to operations performed on a lightweight directory access protocol (LDAP) based database maintained on a directory server;
    publish, by the processing device in the client computing system, a database operation request to a global exchange on the AMQP server, wherein the database operation request identifies an operation to be performed on the LDAP based database, wherein the client computing system is not compatible with LDAP;
    obtain, by the processing device in the client computing system, database operation result data from the database operation result messages in the client queue that corresponds to the client computing system in response to publishing the database operation request, wherein the AMQP server pushes the database operation result messages comprising the database operation result data to the client computing system in response to the client computing system having subscribed to the client queue; and
    convert, by the processing device in the client computing system, the database operation result data from a wire level format to a data format that is compatible with the client computing system.

7. The non-transitory computer-readable storage medium of claim 6, wherein the database operation request specifies a client exchange for publishing database operation result data, the client exchange corresponding to the client queue for allowing the client computing system access to the database operation result data.

8. The non-transitory computer-readable storage medium of claim 6, wherein the instructions further cause the processing device to:
    configure communication with the AMQP server to publish database operation requests to the global exchange, the global exchange having a corresponding global queue that has a plurality of directory servers as subscribers.

9. The non-transitory computer-readable storage medium of claim 6, wherein the database operation request comprises a search request and the database operation result data comprises one or more entries that satisfy search criteria in the database operation request and a result code that indicates whether the search operation succeeded.

10. The non-transitory computer-readable storage medium of claim 6, wherein the database operation request comprises a request to update an entry in the LDAP based database and the database operation result data comprises a result code that indicates whether the update operation succeeded.

11. A system comprising:
a persistent storage unit to store configuration data that associates a database operation request with a global exchange hosted by an advanced message queuing protocol (AMQP) server; and
a message-based client system coupled to the persistent storage unit to subscribe to a client queue on the AMQP server to obtain database operation result messages that pertain to operations performed on a lightweight directory access protocol (LDAP) based database maintained on a directory server, to publish the database operation request to the global exchange on the AMQP server, wherein the database operation request identifies an operation to be performed on the LDAP based database, wherein the client system is not compatible with LDAP, to obtain the database operation result data from the database operation result messages in the client queue that corresponds to the system in response to publishing the database operation request, wherein the AMQP server pushes the database operation result messages comprising the database operation result data to the client computing system in response to the client computing system having subscribed to the client queue, and to convert the database operation result data from a wire level format to a data format that is compatible with the client computing system.

12. The system of claim 11, wherein the database operation request specifies a client exchange for publishing database operation result data, the client exchange corresponding to the client queue for allowing the client computing system access to the database operation result data.

13. The system of claim 11 wherein the message-based client system further to configure communication with the AMQP server to publish database operation requests to the global exchange, the global exchange having a corresponding global queue that has a plurality of directory servers as subscribers.

14. The system of claim 11, wherein the database operation request comprises a search request and the database operation result data comprises one or more entries that satisfy search criteria in the database operation request and a result code that indicates whether the search operation succeeded.

15. The system of claim 11, wherein the database operation result data comprises a result code that indicates whether the update operation succeeded.

* * * * *